(12) United States Patent
Pedross-Engel et al.

(10) Patent No.: US 11,460,572 B2
(45) Date of Patent: Oct. 4, 2022

(54) MILLIMETER WAVE IMAGING SYSTEMS AND METHODS USING DIRECT CONVERSION RECEIVERS AND/OR MODULATION TECHNIQUES

(71) Applicant: University of Washington, Seattle, WA (US)

(72) Inventors: Andreas Pedross-Engel, Seattle, WA (US); Daniel Arnitz, Seattle, WA (US); Matthew S. Reynolds, Seattle, WA (US)

(73) Assignee: University of Washington, Seattle, WA (US)

( * ) Notice: Subject to any disclaimer, the term of this patent is extended or adjusted under 35 U.S.C. 154(b) by 722 days.

(21) Appl. No.: 16/323,491

(22) PCT Filed: Aug. 10, 2017

(86) PCT No.: PCT/US2017/046337
§ 371 (c)(1),
(2) Date: Feb. 5, 2019

(87) PCT Pub. No.: WO2018/089068
PCT Pub. Date: May 17, 2018

(65) Prior Publication Data
US 2021/0278526 A1   Sep. 9, 2021

Related U.S. Application Data

(60) Provisional application No. 62/374,285, filed on Aug. 12, 2016.

(51) Int. Cl.
*G01S 13/89* (2006.01)
*G01S 13/32* (2006.01)
(Continued)

(52) U.S. Cl.
CPC ............ *G01S 13/89* (2013.01); *G01S 13/325* (2013.01); *H04L 27/20* (2013.01); *H04N 5/2256* (2013.01); *G01S 13/887* (2013.01)

(58) Field of Classification Search
None
See application file for complete search history.

(56) References Cited

U.S. PATENT DOCUMENTS 5,323,162 A   6/1994  Fujisaka et al.
5,956,318 A * 9/1999  Saeki ................... H04L 27/2613
                                                          370/206
(Continued)

FOREIGN PATENT DOCUMENTS

JP   H06118166 A   4/1994
JP   H09178846 A   7/1997
(Continued)

OTHER PUBLICATIONS

"Self-Jamming Mitigation Via Coding for Millimeter-Wave Imaging With Direct Conversion Receivers", IEEE Microwave and Wireless Components Letters, vol. 2 Issue 4, Apr. 2017, pp. 410-412.

(Continued)

*Primary Examiner* — Whitney Moore
(74) *Attorney, Agent, or Firm* — Stoel Rives LLP

(57) ABSTRACT

Examples of active millimeter-wave imaging systems are described which may utilize modulation schemes to provide illumination signals. The use of modulation techniques may allow for the use of direct-conversion receivers while retaining an ability to separate desired received signal from self-jamming and/or DC offset signal(s) generated by the direct-conversion receivers. In some examples, modulation schemes include the use of balanced orthogonal codes which may support MIMO or massive MIMO imaging systems.

24 Claims, 6 Drawing Sheets

(51) Int. Cl.
*H04L 27/20* (2006.01)
*H04N 5/225* (2006.01)
*G01S 13/88* (2006.01)

(56) References Cited

U.S. PATENT DOCUMENTS

| | | | |
|---|---|---|---|
| 6,115,423 | A | 9/2000 | Shen et al. |
| 6,115,426 | A | 9/2000 | Fujimoto et al. |
| 6,563,462 | B1 | 5/2003 | Moffa et al. |
| 6,917,327 | B2 | 7/2005 | Jenkins |
| 7,259,715 | B1 | 8/2007 | Garren et al. |
| 7,460,055 | B2 | 12/2008 | Nishijima et al. |
| 7,978,120 | B2* | 7/2011 | Longstaff ............... G01S 13/48 342/22 |
| 8,643,286 | B2* | 2/2014 | Schenk ................ H05B 47/22 315/152 |
| 8,855,580 | B2* | 10/2014 | Dent ..................... H04B 1/525 455/78 |
| 9,099,786 | B2 | 8/2015 | Bowers et al. |
| 9,105,978 | B2 | 8/2015 | Bowers et al. |
| 9,268,016 | B2 | 2/2016 | Smith et al. |
| 10,320,084 | B2 | 6/2019 | Bily et al. |
| 2004/0021600 | A1 | 2/2004 | Wittenberg |
| 2008/0292163 | A1 | 11/2008 | Dibella et al. |
| 2009/0123046 | A1 | 5/2009 | Mielekamp et al. |
| 2009/0123048 | A1 | 5/2009 | Leroux et al. |
| 2009/0237092 | A1 | 9/2009 | Zoughi et al. |
| 2010/0220001 | A1 | 9/2010 | Longstaff |
| 2011/0012777 | A1 | 1/2011 | Tomich et al. |
| 2011/0051780 | A1 | 3/2011 | Kawasaki |
| 2011/0122477 | A1 | 5/2011 | Ridgway |
| 2011/0181461 | A1 | 7/2011 | Sarkis |
| 2011/0199254 | A1 | 8/2011 | Bishop et al. |
| 2012/0194399 | A1 | 8/2012 | Bily et al. |
| 2013/0022222 | A1 | 1/2013 | Zschau et al. |
| 2013/0162490 | A1 | 6/2013 | Blech |
| 2014/0111367 | A1 | 4/2014 | Kishigami et al. |
| 2014/0232591 | A1 | 8/2014 | Liu et al. |
| 2014/0266869 | A1 | 9/2014 | Liu et al. |
| 2015/0207224 | A1 | 7/2015 | Rose |
| 2015/0285901 | A1 | 10/2015 | Rose |
| 2016/0065323 | A1 | 3/2016 | Zemp |
| 2016/0066811 | A1 | 3/2016 | Mohamadi |
| 2016/0124075 | A1 | 5/2016 | Vogt et al. |
| 2017/0010352 | A1 | 1/2017 | Liu et al. |
| 2018/0017667 | A1 | 1/2018 | Rose |
| 2018/0159199 | A1 | 6/2018 | Kolokotronis |
| 2019/0265347 | A1 | 8/2019 | Wintermantel |

FOREIGN PATENT DOCUMENTS

| | | |
|---|---|---|
| JP | 2011135484 A | 7/2011 |
| JP | 2013065995 A | 4/2013 |
| JP | 2013113645 A | 6/2013 |
| JP | 2014182124 A | 9/2014 |
| JP | 2014202670 A | 10/2014 |
| JP | 2016507718 A | 3/2016 |
| WO | 9853556 A2 | 11/1998 |
| WO | 2018147929 A2 | 8/2018 |

OTHER PUBLICATIONS

International Search Report and Written Opinion dated Apr. 26, 2018 for PCT Application No. PCT/US2017/46337.
Devadithya, , "Computational Imaging for Dynamic Metasurface Based Synthetic Aperture Radars"; Thesis Master of Science in Electrical Engineering, University of Washington (Aug. 2017); 73 pgs.
Tomkins, Alexander et al., "A zero-IF 60 GHz 65 nm CMOS transceiver with direct BPSK modulation demonstrating up to 6 Gb/s data rates over a 2 m wireless link." IEEE Journal of Solid-State Circuits 44.8 (/2009): 2085-2099.
International Preliminary Report on Patentability for PCT Application No. PCT/US2017/046337 dated Feb. 21, 2019.
U.S. Appl. No. 16/467,819 titled "Millimeter Wave and/or Microwave Imaging Systems and Methods Including Examples of Partioned Inverse and Enhanced Resolution Modes and Imaging Devices" filed Dec. 8, 2017.
Appleby, et al., Millimeter-Wave and Submillimeter-Wave Imaging for Security and Surveillance, Proceedings of the IEEE, Aug. 2007, 8 pages.
Charvat, et al., An Ultrawideband (UWB) Switched-Antenna-Array Radar Imaging System, 2010 IEEE International Symposium on Phased Array Systems and Technology, Oct. 2010, 8 pages.
Cumming, et al., Digital Processing of Synthetic Aperture Radar Data: Algorithms and Implementation, Artech House, 2005.
Devadithya, et al., GPU Accelerated Partitioned Reconstruction Algorithm for Millimeter-Wave 3D Synthetic Aperture Radar (SAR) Images, 2017 IEEE MTT-S International Microwave Symposium (IMS), Jun. 2017, 4 pages.
Devadithya, et al., Partitioned Inverse Image Reconstruction for Millimeter-Wave SAR Imaging, 2017 IEEE International Conference on Acoustics, Speech and Signal Processing, Mar. 2017, 5 pages.
Eld'En, et al., Solving Ill-Posed Linear Systems With GMRES and a Singular Preconditioner, SIAM Journal on Matrix Analysis and Applications, vol. 33, No. 4, Dec. 2012, 26 pages.
Fromenteze, et al., Computational imaging using a mode-mixing cavity at microwave frequencies, Applied Physics Letters, May 2015, 6 pages.
Georgiou, et al., Hadamard matrices, orthogonal designs and construction algorithms, University of Wollongong Research Online, 2002, 59 pages.
Gollub, et al., Large Metasurface Aperture for Millimeter Wave Computational Imaging at the Human-Scale, www.nature.com/scientificreports, Feb. 2017, 9 pages.
Hashemi, et al., The Indoor Radio Propagation Channel, Proceedings of the IEEE, vol. 81, No. 7, Jul. 1993, 26 pages.
Haupt, , Antenna Arrays: A Computational Approach, Wiley-IEEE Press, Apr. 2010.
Holloway, et al., An Overview of the Theory and Applications of Metasurfaces: The Two-Dimensional Equivalents of Metamaterials, IEEE Antennas and Propagation Machine, vol. 54, No. 2, Apr. 2012, 26 pages.
Hunt, et al., Metamaterial Apertures for Computational Imaging, Science, vol. 339, Jan. 2013, 5 pages.
Imani, et al., Analytical modeling of printed metasurface cavities for computational imaging, Journal of Applied Physics, Oct. 2016, 15 pages.
Jin, et al., Design and Performance of a New Digital Phase Shifter at X-Band, IEEE Microwave and Wireless Components Letters, vol. 14, No. 9, Sep. 2004, 3 pages.
Klauder, et al., The Theory and Design of Chirp Radars, The Bell System Technical Journal, Jul. 1960, 64 pages.
Lipworth, et al., Metamaterial apertures for coherent computational imaging on the physical layer, Journal of the Optical Society of America, Aug. 2013, 10 pages.
Marks, et al., Fourier Accelerated Multistatic Imaging: A Fast Reconstruction Algorithm for Multiple-Input-Multiple-Output Radar Imaging, IEEE Access, Feb. 2017, 14 pages.
Melvin, et al., Principles of Modern Radar: Advanced Techniques, SciTech Publishing, 2013, 25 pages.
Moreira, et al., A Tutorial on Synthetic Aperture Radar, IEEE Geoscience and Remote Sensing Magazine, Mar. 2013, 38 pages.
Papoulis, et al., Probability, Random Variables, and Stochastic Processes, McGraw Hill, 2002, 861 pages.
Patrick, et al., Multimode illumination for speckle reduction and angle neutrality in millimeter wave active imaging: range and time-resolved mode averaging, Journal of Optical Society of America, Oct. 2014, 7 pages.
Patrick, et al., Range resolved mode mixing in a large volume for the mitigation of speckle and strategic target orientation requirements in active millimeter-wave imaging, Journal of the Optical Society of America, Apr. 2015, 10 pages.
Pedross-Engel, et al., Orthogonal Coded Active Illumination for Millimeter Wave, Massive-MIMO Computational Imaging With

(56) References Cited

OTHER PUBLICATIONS

Metasurface Antennas, IEEE Transactions on Computational Imaging, vol. 4, No. 2, Jun. 2018, 10 pages.

Pedross-Engel, , Self-Jamming and DC Offset Mitigation for Millimeter-Wave Imaging and Channel Estimation with Direct Conversion Receivers, Aug. 2016.

Pedross-Engel, et al., Self-Jamming Mitigation via Coding for Millimeter-Wave imaging With Direct Conversion Receivers, IEEE Microwave and Wireless Components Letters, Apr. 2017, 3 pages.

Rankin, et al., Millimeter Wave Array for UAV Imaging MIMO Radar, 16th International Radar Symposium (IRS), Jun. 2015, 6 pages.

Saad, et al., GMRES: A Generalized Minimal Residual Algorithm for Solving Nonsymmetric Linear Systems, SIAM Journal on Scientific and Statistical Computing, vol. 7, No. 3, Jul. 1986, 14 pages.

Sharma, et al., A Ku-Band 6-bit Digital Phase Shifter MMIC for Phased Array Antenna Systems, IEEE International Microwave and RF Conference, Dec. 2015, 4 pages.

Sheen, et al., Three-Dimensional Millimeter-Wave Imaging for Concealed Weapon Detection, IEEE Transactions on Microwave Theory and Techniques, vol. 49, No. 9, Sep. 2001, 12 pages.

Smith, et al., Analysis of a Waveguide-Fed Metasurface Antenna, American Physical Society, Nov. 2017, 16 pages.

Smith, et al., Analysis of a Waveguide-Fed Metasurface Antenna, Physical Review Applied, Nov. 2017.

Spence, , Classification of Hadamard matrices of order 24 and 28, Discrete Mathematics, Jun. 1995, 59 pages.

Tomkins, et al., A Zero-IF 60 GHz 65 nm CMOS Transceiver With Direct BPSK Modulation Demonstrating up to 6 GB/s Data Rates Over a 2 m Wireless Link, IEEE Journal of Solid-State Circuits, vol. 44, No. 8, Aug. 2009, 15 pages.

Viegas, et al., Millimeter Wave Radiometers for Applications in Imaging and Nondestructive Testing, 2015 8th UK, Europe, China Millimeter Waves and THz Technology Workshop (UCMMT), Sep. 2015, 4 pages.

Vu, et al., An Impulse Response Function for Evaluation of UWB SAR Imaging, IEEE Transactions on Signal Processing, vol. 58, No. 7, Jul. 2010, 6 pages.

Watts, et al., 2D and 3D Millimeter-Wave Synthetic Aperture Radar Imaging on a PR2 Platform, IEEE/RSJ International Conference on Intelligent Robots and Systems, Oct. 2016, 7 pages.

Watts, et al., X-band SAR imaging with a liquid-crystal-based dynamic metasurface antenna, Journal of the Optical Society of America B, vol. 34, No. 2, Feb. 2017.

Wolfe, et al., Digital Phase Shifter Elements For A K1-Band Phased Array Radar, MTT-S International Microwave Symposium Digest, vol. 76, Jun. 1976, p. 347-350.

Yurduseven, et al. Comparison of Different Reconstruction Algorithms for Image Reconstruction in Metamaterial Aperture Based Imaging System, 2015 9th European Conference on Antennas and Propagation (EuCAP), Apr. 2015, 5 pages.

Yurduseven, et al., Frequency-diverse microwave imaging using planar Mills-Cross cavity apertures, Optics Express, Apr. 2016.

Yurduseven, et al. Multistatic microwave imaging with arrays of planar cavities, IET Microwaves, Antennas, & Propagation, Apr. 2016, 8 pages.

Yurduseven, et al., Printed Aperiodic Cavity for Computational and Microwave Imaging, IEEE Microwave and Wireless Components Letters, vol. 26, No. 5, May 2016.

Yurduseven, et al., Resolution of the Frequency Diverse Metamaterial Aperture Imager, Progress In Electromagnetics Research, vol. 150, Jan. 2015, 11 pages.

Zhang, et al., A Robust Reweighted L1-Minimization Imaging Algorithm for Passive Millimeter Wave SAIR in Near Field, Sensors, Sep. 2015, 16 pages.

Albert, Arthur E. , "Regression and the Moore-Penrose Pusedoinverse", Academic Press, Oct. 1972.

Balanis, Constantine A., "Antenna Theory", Analysis and Design, 3 ed. Wiley-Interscience, 2005. Chapter 3.

Belcher, D.P. et al., "High Resolution Processing of Hybrid Strip-Map/Spotlight Mode SAR", IEE Proceedings—Radar, Sonar Navigation., vol. 143, No. 6, Dec. 1996, p. 366-374.

Bowen, Patrick T. et al., "Using a Discrete Dipole Approximation To Predict Complete Scattering of Complicated Metamaterials", New Journal of Physics, vol. 14, No. 3, p. 033038, Mar. 2012.

Carrara, Walter G. et al., "Synthetic Aperture Radar Fundamentals", Spotlight Synthetic Aperture Radar: Signal Processing Algorithms, Chapter 2, Artech House Publishers, Oct. 1995.

Cerutti-Maori, Delphine et al., "MIMO SAR Processing for Multichannel High-Resolution Wide-Swath Radars", IEEE Transactions on Geoscience and Remote Sensing, vol. 52, No. 8, Aug. 2014, p. 5034-5055.

Cumming, Ian G. et al., "Digital Processing of Seasat SAR Data", Acoustics, Speech, and Signal Processing, IEEE International Conference on ICASSP, vol. 4, Apr. 1979, p. 710-718.

Franceschetti, Giorgio et al., "Efficient Simulation of Hybrid Stripmap/Spotlight SAR Raw Signals From Extended Scenes", IEEE Transactions on Geoscience and Remote Sensing, vol. 42, No. 11, Nov. 2004, p. 2385-2396.

Fulton, Caleb et al., "Digital Phased Arrays: Challenges and Opportunities", Proceedings of the IEEE, vol. 104, No. 3, p. 487-503, Mar. 2016.

Gresham, Ian et al., "Ultra-Wideband Radar Sensors for Short-Range Vehicular Applications", IEEE Transactions on Microwave Theory and Techniques, vol. 52, No. 9, Sep. 2004, p. 2105-2122.

Hansen, Per Christian et al., "The Use of the L-Curve in the Regularization of Discrete Ill-Posed Problems", SIAM Journal on Scientific Computing, vol. 14, No. 6, p. 1487-1503, Nov. 1993.

Hellsten, Hans et al., "An Inverse Method for the Processing of Synthetic Aperture Radar Data", Inverse Problems, vol. 3, No. 1, Feb. 1987, p. 111.

Hunt, John et al., "Metamaterial Microwave Holographic Imaging System", Journal of the Optical Society of America A, vol. 31, No. 10, p. 2109-2119, Oct. 2014.

Krieger, Gerhard , "MIMO-SAR: Opportunities and Pitfalls", IEEE Transactions on Geoscience and Remote Sensing, vol. 52, No. 5, May 2014 p. 2628-2645.

Larouche, Stéphane et al., "Infrared Metamaterial Phase Holograms", Nature Materials, vol. 11, May 2012, p. 450-454.

Mailloux, Robert J. , "Phased Array Antenna Handbook", Elements for Phased Arrays, 1ed. Artech House, Feb. 1994, Chapter 5.

Menke, William , "Geophysical Data Analysis: Discrete Inverse Theory", International Geophysics Series, Academic Press, London, Jan. 1984.

Moreira, Alberto , "Real-Time Synthetic Aperture Radar (SAR) Processing With a New Subaperture Approach", IEEE Transactions on Geoscience and Remote Sensing, vol. 30, No. 4, p. 714-722, Jul. 1992.

Munson, David C. et al., "A Signal Procssing View of Strip-Mapping Synthetic Aperture Radar", IEEE Transactions on Acoustics, Speech, and Signal Processing, vol. 37, No. 12, Dec. 1989, p. 2131-2147.

Oppenheim, Alan V. et al., "Discrete-Time Signal Processing", Pearson Education Limited, Jul. 2013.

Orfanidis, Sophocles J. , "Electromagnetic Waves and Antennas", Rutgers University, Aug. 2016.

Proakis, John et al., "Digital Communications", Digital Communications, 5th ed., McGraw-Hill, Nov. 2007.

Raneu, Keith R. et al., "Precision SAR Processing Using Chirp Scaling", IEEE Transactions on Geoscience and Remote Sensing, vol. 32, No. 4, Jul. 1994, p. 786-799.

Rosen, Paul et al., "The NASA-ISRO SAR Mission—An International Space Partnership for Science and Societal Benefit", IEEE Radar Conference (RadarCon), Oct. 2015, p. 1610-1613.

Sack, M. et al., "Application of Efficient Linear FM Matched Filtering Algorithms To Synthetic Aperture Radar Processing", Communications, Radar and Signal Processing, IEEE Proceedings F, vol. 132, No. 1, p. 45-57, Feb. 1985.

Sleasman, Timothy et al., "Design Considerations for a Dynamic Metamaterial Aperture for Computational Imaging at Microwave Frequencies", Journal of the Optical Society of America B, vol. 33, No. 6, Jun. 2016, p. 1098-1111.

(56) References Cited

OTHER PUBLICATIONS

Solimene, Raffaele et al., "SAR Imaging Algorithms and Some Uncoventional Applications: A Unified Mathematical Overview", IEEE Signal Processing Magazine, Jul. 2014, p. 90-98.
Stark, Louis, "Microwave Theory of Phased-Array Antennas—A Review", Proceedings of the IEEE, vol. 62, No. 12, Dec. 1974, p. 1661-1701.
Suess, M. et al., "A Novel High Resolution, Wide Swath SAR System", Geoscience and Remote Sensing Symposium, 2001. IGARSS 2001. IEEE 2001 International, vol. 3, 2001, p. 1013-1015 vol. 3.
Visser, Hubregt J., "Array and Phased Array Antenna Basics", Wiley, Sep. 2005.
Vogel, Curtis R., "Computational Methods for Inverse Problems", Society for Industrial and Applied Mathematics, Philadelphia, Jun. 2002.
Wang, Wen-Qin, "MIMO SAR Imaging: Potential and Challenges", IEEE Aerospace and Electronic Systems Magazine, vol. 28, No. 8, Aug. 2013, p. 18-23.
Werninghaus, Rolf et al., "The Terrasar-X Mission and System Design", IEEE Transactions on Geoscience and Remote Sensing, vol. 48, No. 2, Feb. 2010, p. 606-614.
Wu, K. et al., "Coherent Sub Aperture Processing Techniques for Synthetic Aperture Radar", Department of Communications, Canada: Communications Research Centre, Jan. 1984.
JP Office Action dated Jun. 4, 2021 for JP Application No. 2019-507280.
Dienstfrey, A., et al., "Colored Noise and Regularization Parameter Selection for Waveform Metrology", IEEE Transactions on Instrumentation and Measurement, vol. 63, No. 7, pp. 1769-1778, Jul. 2014.

\* cited by examiner

MILLIMETER WAVE IMAGING SYSTEMS AND METHODS USING DIRECT CONVERSION RECEIVERS AND/OR MODULATION TECHNIQUES

CROSS-REFERENCE TO RELATED APPLICATION(S)

This application is a 35 U.S.C. § 371 National Stage Application of PCT Application No. PCT/US2017/046337, filed Aug. 10, 2017, which claims the benefit under 35 U.S.C. § 119 of the earlier filing date of U.S. Provisional Application Ser. No. 62/374,285 filed Aug. 12, 2016, the entire contents of which are hereby incorporated by reference, in their entirety, for any purposes.

STATEMENT REGARDING RESEARCH & DEVELOPMENT

This invention was made with government support under Grant No. 14-DHS-1100 AM02, awarded by the Department of Homeland Security and Grant No. 15-USG-1064 MOD03, awarded by the National Reconnaissance Office. The government has certain rights in the invention.

TECHNICAL FIELD

Examples described herein relate to millimeter-wave imaging systems and methods. Examples are described which include the use of direct conversion receivers and/or modulation techniques for illumination signals in millimeter-wave imaging systems.

BACKGROUND

Millimeter-wave (mmW) imaging has a variety of applications, such as security screening, through-wall sensing and imaging, and making images of the earth and man-made structures from aircraft or spacecraft.

In active mmW imaging, the region of interest (ROI) in a scene is illuminated by one or more transmitters, while the scattered energy from the scene is spatially sampled by one or more antennas and receivers. Many active imagers leverage mechanical motion of an antenna array to form a synthetic aperture radar (SAR) image. Other active imagers use phased arrays such as active electronically scanned arrays (AESAs). Phased arrays exploit a large number of antenna elements to form a large, spatially sampled aperture. Other imagers use a multiple input multiple output (MIMO) architecture comprising transmitters and receivers spatially distributed to form a sampled aperture.

SUMMARY

Examples of imaging systems are described herein. An example imaging system may include an illumination system. The illumination system may include a carrier wave source configured to generate a radio frequency signal, a modulator, coupled to the carrier wave source and configured to modulate the radio frequency signal using digital symbols to provide illumination signals, and a plurality of antennas coupled to the modulator and configured to illuminate a scene with the illumination signals. The imaging system may include a direct conversion receiver configured to receive energy from a scattered illumination signal resulting in part from scattering of the illumination signals from the scene. The imaging system may include an imaging processor coupled to the direct conversion receiver and configured to provide image data associated with the scene based on the energy from the scattered illumination signal.

In some examples, the radio frequency signal has a frequency between 30 and 300 GHz.

In some examples, the modulator is configured to modulate the radio frequency signal using phase modulated digital symbols having two or more phases.

In some examples, the modulator is configured to modulate the radio frequency signal using amplitude modulated digital symbols having two or more amplitudes.

In some examples, the modulator is configured to modulate the radio frequency signal using a respective digital code from a set of codes for each of the plurality of antennas. In some examples, the set of codes includes balanced orthogonal codes. In some examples, the set of codes includes Hadamard codes.

In some examples, the imaging system may include a display coupled to the imaging processor and configured to display an image based on the image data, wherein the image comprises a representation of the scene.

In some examples, the scene comprises a human.

In some examples, the direct conversion receiver is configured to receive the energy during at least a portion of time the illumination system is providing the illumination signals.

In some examples, the direct conversion receiver is coupled to the illumination system, and wherein the direct conversion receiver is configured to receive the energy from the scattered illumination signal using knowledge of the radio frequency signal.

In some examples, the direct conversion receiver is configured to generate receiver signals including contributions from the energy received from the scattered illumination signal, self-jamming, and DC offset, and wherein the imaging system further comprises a post-processor configured to subtract receiver signals received corresponding to one group of modulation symbols from receiver signals received corresponding to another group of modulation symbols to separate the contributions of the energy received from the scattered illumination signal from the self-jamming and DC offset.

Examples of methods are described herein. An example method may include modulating a radio frequency signal using digital symbols to provide illumination signals, illuminating the scene with an illumination signal using a plurality of antennas, receiving, using a direct conversion receiver, energy from a scattered illumination signal resulting in part from scattering of the illumination signals from the subject, and generating image data associated with the scene based on the energy from the scattered illumination signal.

In some examples, the digital symbols comprise binary phase shift keying modulation or quadrature phase shift keying modulation.

In some examples, the receiving occurs at least in part simultaneously with the illuminating.

In some examples, the plurality of antennas are stationary during the illuminating.

Example methods may include modulating the illumination signals using balanced orthogonal codes for respective ones of the plurality of antennas.

Example methods may include displaying an image based on the image data. In some examples, the image comprises a representation of the scene.

In some examples, receiving comprises receiving based on a phase shift keying modulation.

In some examples, receiving comprises separating energy from the scattered illumination signal from a self-jamming signal provided by the direct conversion receiver.

In some examples, separating energy comprises subtracting receiver signals associated with groups of modulation symbols.

DETAILED DESCRIPTION

Figure 1:
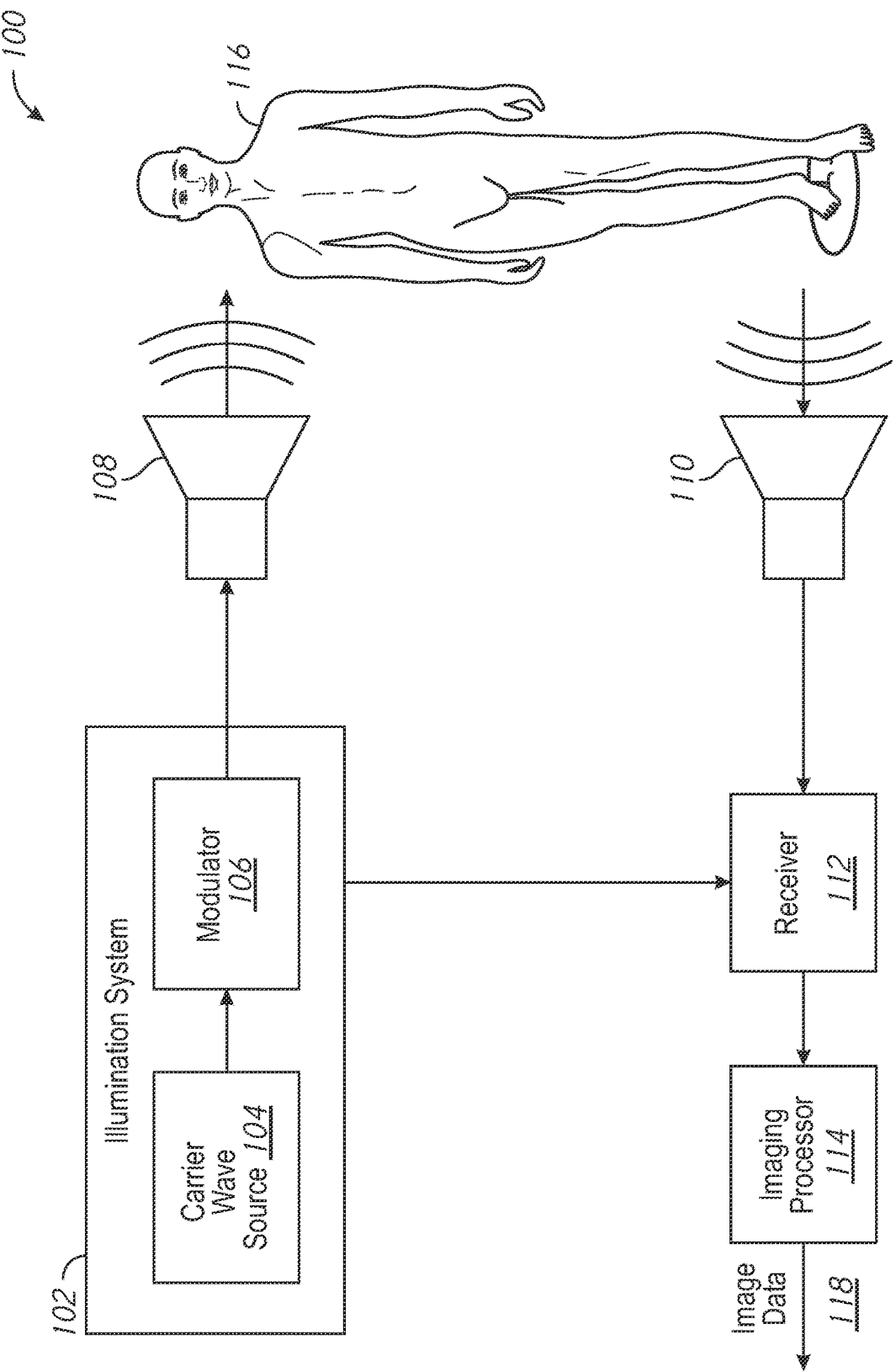
FIG. 1 is a schematic illustration of a system arranged in accordance with examples described herein.

Certain details are set forth below to provide a sufficient understanding of described embodiments. However, it will be clear to one skilled in the art that embodiments may be practiced without various of these particular details. In some instances, well-known circuits, control signals, timing protocols, and/or software operations have not been shown in detail in order to avoid unnecessarily obscuring the described embodiments.

Traditional approaches to active mmW imaging often have significant challenges. Mechanically scanned SAR acquisition time is often slow due to the speed of mechanical motion, which may lead to motion blur for close-in, fast moving targets. Phased array AESA based imagers are often expensive, power hungry, and complex due to the large amount of RF hardware such as transmitters (TX), receivers (RX), and phase shifters needed. MIMO imagers similarly suffer in power consumption and complexity due to the large number of transmitters and receivers typically employed.

One approach to reduce the power consumption and complexity of the receivers used in mmW imaging is to employ simplified receivers such as direct conversion (also called zero-IF or homodyne) receivers. Examples described herein may aid in mitigating self-jamming and/or DC offset impairments which may be observed when direct-conversion (e.g., homodyne) receivers are used for coherent millimeter-wave (mmW) active imaging and/or channel estimation. Some examples include a modulation coding scheme using BPSK modulation, for example with a balanced orthogonal code at the illumination system. This modulation may permit the separation of desired signals (e.g., point-scatterer returns that contribute to the mmW image) from the undesired components due to DC offset and carrier wave source (e.g., local oscillator (LO)) leakage in the receiver I/Q demodulator. Modulations techniques described herein may generally use one or more symbols— e.g., with a symbol represented by each frequency, phase, and/or amplitude used in the modulation techniques. In some embodiments, the symbols may represent digital values such as one or more bits, with each symbol comprising a phase state, an amplitude state, or a combination thereof corresponding to a certain pattern of one or more bits.

Methods and systems described herein may mitigate self-jamming and DC offset impairments which may be observed when direct-conversion (e.g., homodyne) receivers are used for coherent millimeter-wave (mmW) active imaging and/or channel estimation. Examples described herein leverage coded modulation in the illumination system (e.g., transmitter) that illuminates the scene which may achieve several benefits, including removal and/or reduction of unwanted DC offsets due to non-ideal semiconductor components in the I/Q demodulator; removal and/or reduction of the unwanted DC component due to self-jamming caused by carrier wave signal (e.g., local oscillator LO) feedthrough; and improved signal-to-noise ratio (SNR) in the imaging system via averaging based reduction in noise gain. Furthermore, examples described herein use modulation (e.g., BPSK, QPSK, or other multiphase modulation) with optional balanced orthogonal codes to allow the separation of multiple illuminating signals on the same frequency while retaining the benefits described herein in some examples.

Some example systems utilize multiple-input multiple-output (MIMO) millimeter-wave (mmW) imaging. In some examples, metasurface antennas may be used, which may facilitate flexible and low cost massive MIMO millimeter-wave (mmW) imaging. MIMO imaging systems may distinguish signals sent from different antennas (e.g., different transmitters (TX)) at the receivers (RX) of the imaging system. Accordingly, examples of orthogonal coded active illumination (OCAI) are described which may utilize simultaneous, mutually orthogonal coded illumination (e.g., transmit) signals to illuminate the scene being imaged. OCAI may be robust to code amplitude and code phase imbalance introduced by imperfect TX and RX hardware, while also mitigating common impairments of low cost direct-conversion receivers, such as RX self-jamming and DC offsets as described herein. At the same time, when simultaneous, orthogonally coded illumination waveforms are used, OCAI may allow the separation of the received signal into the contributing parts due to each transmitter.

FIG. 1 is a schematic illustration of a system arranged in accordance with examples described herein. The system 100 includes illumination system 102, carrier wave source 104, modulator 106, antennas 108, antennas 110, receiver 112, imaging processor 114, scene 116, and image data 118. In other examples additional, fewer, and/or rearranged components may be used.

The system 100 may be a millimeter-wave scanner which may be used to image the scene 116. Generally, during operation, the illumination system 102 may provide illumination signal(s) to the antennas 108, which may be used to illuminate the scene 116. The illuminating signals may be scattered from the scene 116 in the form of scattered illumination signals. The scattered illuminated signals may be incident at the antennas 110 and received by receiver 112. An imaging processor 114 may be used to provide image data based on the received energy from the scattered illumination signals.

The carrier wave source 104 may be a millimeter-wave radio frequency (RF) source. Generally, a millimeter-wave RF source may provide (e.g., generate) a signal having a frequency between 30 to 300 gigahertz (GHz), e.g., in the extremely high frequency (EHF) band. In some examples, the signal may have a frequency between 17 to 300 gigahertz (GHz). In some examples, the signal may have a frequency between 10 to 300 gigahertz (GHz). The millimeter-wave RF source may provide a signal having a wavelength from 1 to 10 mm. Signals having wavelengths on the order of millimeters (e.g., between 1 and 10 mm) may advantageously be used as described herein to generate image data associated with a subject. The millimeter-wave signals may be transparent to organic materials (e.g., clothing) but may not deeply penetrate very deeply into biological tissue (e.g., typically less than 1 mm penetration), and accordingly may safely be used to generate images of subjects for security purposes. The carrier wave source 104 may be implemented, for example, by an oscillator.

The modulator 106 may modulate the radio frequency signal provided by the carrier wave source 104. In some examples, the modulator 106 may utilizing phase shift keying modulation. Binary phase shift keying may be used in some examples. Quadrature phase shift keying may be used in some examples. It should be appreciated that multi-phase modulations having two or more phases may also be employed. In some examples, the modulator 106 may provide amplitude modulation of the radio frequency signal. In further examples, the modulator 106 may yield an orthogonal frequency division multiplexing (OFDM) modulation such as a multi-carrier modulation. The modulated signals provided by the modulator 106 may be referred to as illumination signals. The modulator may provide modulated signals having a number of symbols (e.g., a number of distinct phases, amplitudes, and/or frequencies). In some embodiments each symbol may represent one or more bits.

In some examples, the modulator 106 may, in addition to amplitude- and/or phase-shift keying, modulate the radio frequency signal using a respective code from a set of codes for each of the antennas 108. In this manner, the illumination signal provided by each antenna of the antennas 108 may be identified using its respective code. In some examples, the set of codes may be balanced orthogonal codes, such as Hadamard or Walsh-Hadamard codes.

The illumination system 102 may include the carrier wave source 104 coupled to the modulator 106. The illumination system 102 may provide illumination signals to antennas 108. In some examples, antennas 108 may be included in the illumination system 102 itself. The illumination system 102 may be integral with, supported by, or otherwise coupled to a housing which may be positioned to illuminate the scene 116. For example, the illumination system 102 may be provided in or on a vestibule into which a person may stand to be imaged as described herein. In other embodiments the illumination system 102 may be disposed proximate to a scene 116 comprised of various inanimate objects.

The antennas 108 may be positioned to illuminate scene 116 using the illumination signals. For example, the antennas 108 may be coupled to the modulator 106 and may direct the illumination signals toward the scene 116. In some examples, the antennas 108 may move relative to the scene 116 during illumination of the scene 116. In some examples, the antennas 108 may be stationary. Any number of antennas 108 may be used, including 1, 2, 3, 4, 5, 6, 7, 8, 16, 32, 64, 128, or another number of antennas.

Antennas 110 may be positioned to receive one or more scattered illumination signals resulting from scattering of the illumination signals from the scene 116. In some examples, some or all of antennas 108 may be used to implement antennas 110. For example, a same antenna may be used to transmit an illumination signal and receive energy from a scattered illumination signal. In other examples, all or some of the antennas 110 may be different than antennas 108—e.g., dedicated antennas for illuminating the scene 116 and receiving scattered illumination signals may be provided. Any number of antennas 110 may be used, including 1, 2, 3, 4, 5, 6, 7, 8, 16, 32, 64, 128, or another number of antennas.

In some examples, the antennas 108 and/or antennas 110 may be implemented using one or more metasurface antennas (MSAs). Meta-surface antennas typically include a dense array of sub-wavelength unit cells, which may e.g. be waveguide or cavity fed. Such MSAs can generate frequency-diverse chaotic beam patterns which sample the scene being illuminated and may facilitate compressive imaging. Another MSA approach uses a frequency-diverse chaotic cavity aperture with sub-wavelength irises.

The receiver 112 may be coupled to antennas 110 and may receive energy from the scattered illumination signal(s) incident on the antennas 110. In some examples, the receiver 112 may be implemented using a direct conversion receiver.

Imaging processor 114 may be coupled to the receiver 112. The imaging processor 114 may provide image data 118 which may be associated with scene 116. The image data 118 may be based on the energy received by the receiver 112 from the scattered illumination signal(s). The image data 118 may represent all or a portion of the scene 116. For example, the image data 118 may include pixel data which may be used to render and/or display an image of scene 116. In some examples, the image of scene 116 may be an image which preserves privacy of a person included in the scene 116 (e.g., a representation of a person included in the scene 116, an outline of the person included in the scene 116, a cartoon shape of a person included in the scene 116, etc.).

The image data 118 is generally based on a channel response (e.g., a channel impulse response) between the illumination system 102 and the receiver 112.

The scene 116 may include one or more objects for which imaging is desired. Examples include, but are not limited to, humans, portions of humans, and animals. In some embodiments, scene 116 includes objects being carried by or attached to a person or animal, such as an item of clothing, a metal item, an electronic device such as a mobile phone, or luggage such as a purse, briefcase, or backpack. In some embodiments scene 116 may be imaged for the purpose of determining if any of a number of contraband or potential threat objects are present.

In other embodiments, scene 116 may not include a human, portion of a human, or an animal, but additionally or instead may include one or more inanimate objects and its constituent parts. Further examples of scene 116 include objects such as cars, aircraft, other vehicles, or buildings. Other examples of scene 116 include parts of buildings such as walls, ceilings, floors, columns, reinforcing bars, pipes, wiring, or other utilities. Further examples of scene 116 include the ground, and/or objects at least partially buried in the ground. Still further examples of scene 116 include one or more objects within a container such as a box. The scene 116 need not be fixed in position nor static. In some examples scene 116 may include objects that move with respect to the illumination system 102, for example in the case where objects pass by the illumination system 102 on a conveyor belt or where people pass by the illumination system 102 while riding an escalator, a moving walkway, or other conveyance.

During operation, in some examples, the receiver 112 may receive energy from scattered illumination signal(s) during at least a portion of time the illumination system 102 is directing the illumination signals toward the scene 116. For example, illuminating and receiving may occur in part simultaneously in some examples.

In some examples, the illumination system 102 may be coupled to the receiver 112 such that operation of the receiver 112 may occur with some knowledge of operation of the illumination system 102. For example, the receiver 112 may be coupled to the carrier wave source 104 and may utilize a known frequency of the carrier wave source 104 to receive the scattered illumination signal(s). Additionally or instead, the receiver 112 may be coupled to the modulator 106 and may utilize a known modulation scheme implemented by the modulator 106 to receive the scattered illumination signal(s).

Generally, systems described herein may include an illumination system (e.g., a transmitter TX), a receiver (e.g., RX), and a channel having a response. In some embodiments the channel may be described by a channel impulse response h(t) or a channel transfer function H(f). The channel response h(t) may at least in part characterize a subject (e.g., scene 116 of FIG. 1) which is positioned in the channel, e.g. is at least partially illuminated by the illumination system and provides a scattered illumination signal to the receiver. The channel h(t) generally contains the information which may be used to image the subject in the imaging system's field of view (e.g., illuminated by the illumination system).

Accordingly, it is desirable to determine the channel impulse response (CIR) h(t) between an illumination system and a receiver. For example, in active millimeter wave imaging applications, such as those described herein, h(t) contains the information which is used to reconstruct an observed scene which may be considered to be comprised of a dense array of point scatterers making up the surfaces of the subject(s) being imaged.

CIR may be estimated by considering the illumination system exciting the channel under test with a coherent single tone signal, s(t), which may be given as:

$$s(t)=\cos(2\pi ft+\varphi) \quad \text{Equation 1}$$

where $\varphi$ is a phase offset, f is the signal frequency, and t denotes time. At the receiver location, the received signal may be given as $$r(t)=|H(j2\pi f)|\cos(2\pi ft+\varphi+\angle H(j2\pi f)) \quad \text{Equation 2}$$

where $H(j2\pi f)$ is the frequency response representation (e.g., channel transfer function (CTF)) corresponding to h(t), |.| denotes an absolute value operator, $\angle H(j2f)$ gives the phase of $H(j2\pi f)$ and $j=\sqrt{-1}$ is an imaginary unit. To obtain $H(j2\pi f)$ using a direct conversion (e.g., homodyne) receiver, the signal r(t) (e.g., the signal received by a receiver, such as receiver 112 of FIG. 1), may be down-converted to DC using an I/Q demodulator, to obtain an in-phase term $r_1(t)$ and a quadrature term $r_Q(t)$:

$$r_I(t)=h_{LP}(t)*(r(t)\cdot 2\cos(2\pi ft+\varphi))+n_I(t)$$

$$r_Q(t)=h_{LP}(t)*(r(t)\cdot -2\sin(2\pi ft+\varphi))+n_Q(t) \quad \text{Equations 3 and 4}$$

where $n_I(t)$ and $n_Q(t)$ are noise terms, * denotes the convolution operator, and $h_{LP}(t)$ is the impulse response of a low-pass filter used to mitigate high frequency products which may be caused by the multiplication operator. In this manner, the estimated frequency response $\hat{H}(j2f)$ can be obtained by:

$$\hat{H}(j2\pi f)=r_I(T_S)+jr_Q(T_S) \quad \text{Equation 5}$$

where $T_s$ is the sampling time.

Figure 2:
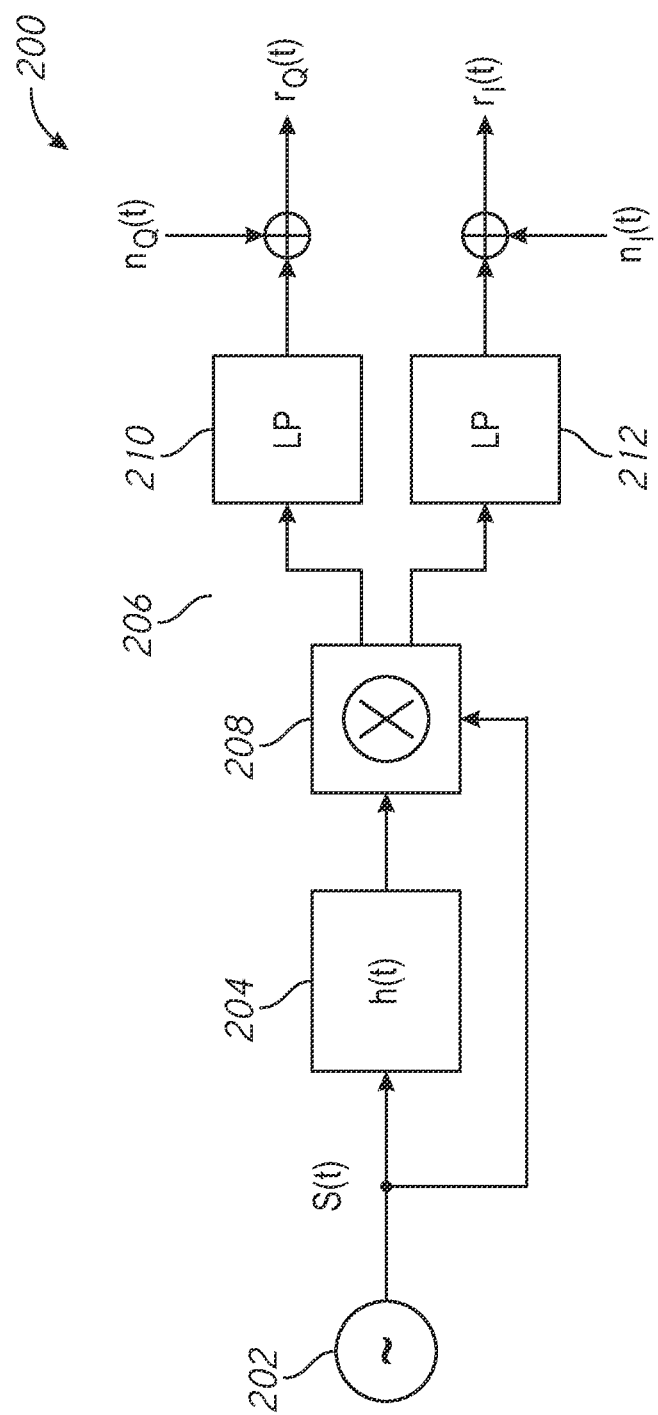
FIG. 2 is a schematic illustration of a system arranged in accordance with examples described herein.

FIG. 2 is a schematic illustration of a system arranged in accordance with examples described herein. The system 200 of FIG. 2 may be used to implement, and/or may be implemented using the system 100 of FIG. 1 in some examples. The system 200 includes illumination system 202, channel 204, and receiver 206. The receiver 206 may include I/Q demodulator 208, filter 210, and filter 212.

The illumination system 202 may be implemented using carrier wave source 104 of FIG. 1 in some examples. In the example of FIG. 2, no modulation may be present, and a single tone frequency may be provided by the illumination system 202. For example, the modulator 106 of FIG. 1 may not be present in illumination system 202. Accordingly, the illumination system 202 may provide s(t) as an illumination signal, as shown in FIG. 2.

The channel 204, which may be represented via its channel impulse response h(t), includes information which may be used to generate image data regarding a subject illuminated by the illumination signal.

The receiver 206 includes I/Q demodulator 208, filter 210, and filter 212. Scattered illumination signal(s) from a subject may be incident at antennas of the receiver 206 (not shown in FIG. 2), and provided to the I/Q demodulator 208. The U/Q demodulator 208 may demodulate the received energy. The I/Q demodulator 208 may receive the signal s(t) from the illumination system 202 which may be used to perform the demodulation. For example, by receiving a signal output of illumination system 202 (e.g., the radio frequency signal), the I/Q demodulator 208 may have knowledge of the illumination frequency (e.g., frequency of the signal s(t)), which may be used to demodulate the received energy from the channel. The filter 210 and filter 212 may be implemented as low pass filters and may remove higher frequency artifacts of the/Q demodulator 208 or other components of the system.

The system 200 of FIG. 2 also includes effects of noise as shown by noise signals $n_Q(t)$ and $n_I(t)$ being added through adders shown at the output of filter 210 and filter 212, respectively. The adders represent a model of the superposition of noise signals arising either in the electronic system or the channel and do not necessarily represent any specific component. The noise may not be present in all examples, but FIG. 2 illustrates how noise in the imaging system may be modeled in some examples.

To obtain frequency response estimates $\hat{H}(j2f)$ for a given set of frequencies $\{f_l:f:f_u\}$, where $f_l$ is the lowest frequency $f_u$ is the highest frequency, and f is a frequency spacing, the illumination and receiving may be repeated for each frequency to obtain $r_Q(t)$ and $r_I(t)$ at each frequency. The signals $r_Q$ and $r_I$ may be provided to an imaging processor, e.g. imaging processor 114 of FIG. 1. The imaging processor may implement, for example, equation 5 to obtain a channel estimate based on the receiver output signals $r_I$ and $r_Q$. The channel estimate may be image data used to render and/or display an image of one or more subject(s) in the channel.

In some examples, mixer devices including an I/Q demodulator, such as the I/Q demodulator 208 of FIG. 2, may not be ideal and may introduce distortions to the down-converted signals $r_I(t)$ and $r_Q(t)$. Examples of distortions which may occur include higher order harmonic output, self-jamming due to unwanted carrier wave source feedthrough (e.g., from the illumination system 202 of FIG. 2), and/or DC offsets in the output of the mixers (e.g., output of the I/Q demodulator 208 in FIG. 2).

Figure 3:
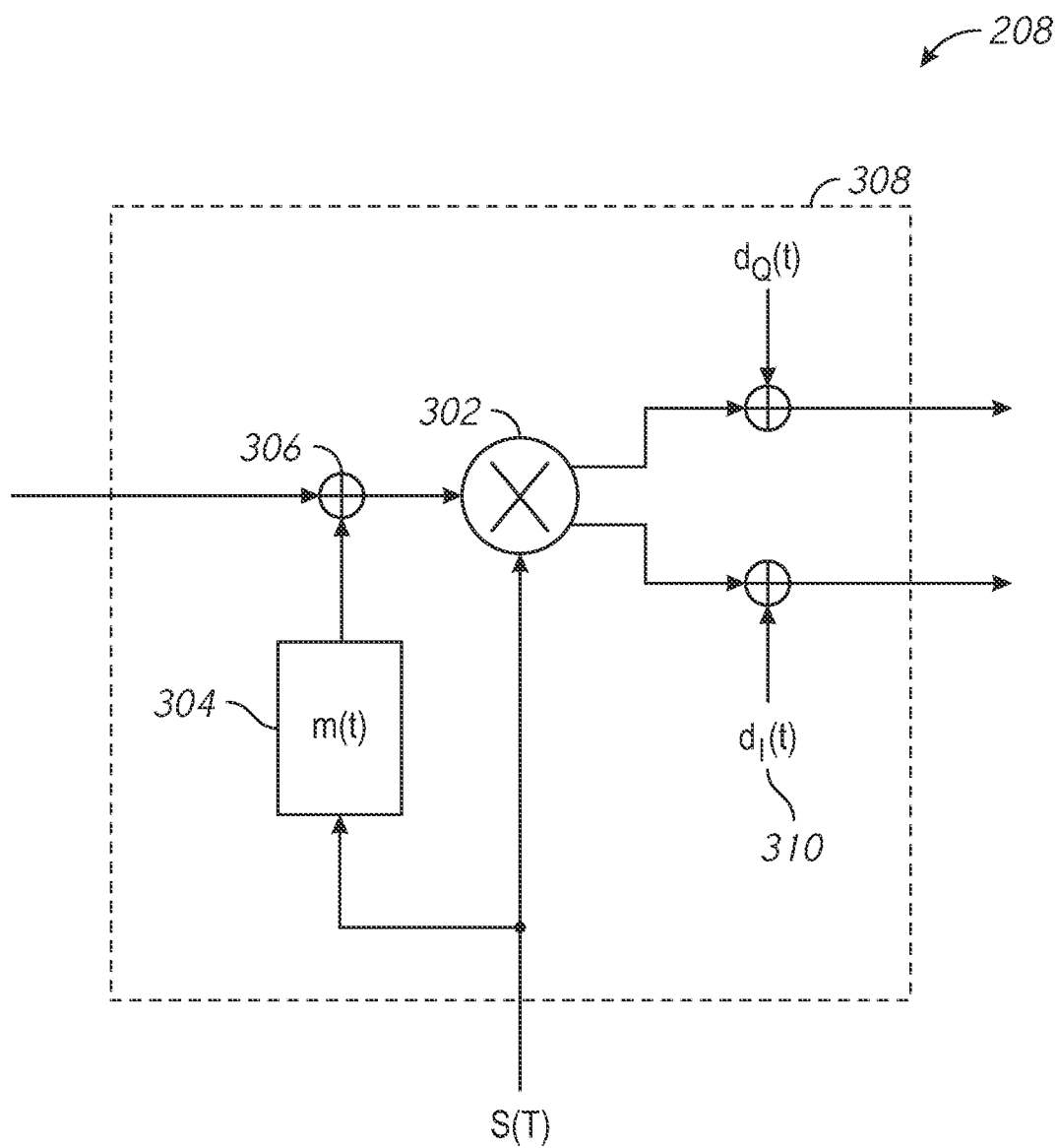
FIG. 3 is a schematic illustration of an I/Q demodulator illustrating non-ideal artifacts in accordance with examples described herein.

FIG. 3 is a schematic illustration of an I/Q demodulator illustrating non-ideal artifacts in accordance with examples described herein. The I/Q demodulator 208 shown in FIG. 3 may implemented by and/or used to implement/Q demodulator 208 as shown in FIG. 2. The I/Q demodulator 208 includes mixer 302 which may receive information from the illumination system 202 (e.g., carrier wave signal s(t)). The self-jamming signal 304 is shown as m(t) added to the signal received from the channel at adder 306. The unwanted response m(t) represents self-jamming due to carrier wave source (e.g., local oscillator) cross-talk from the port of the receiver where information from the illumination system is provided to the mixer input, where energy received from the channel is provided to the receiver, and subsequent reflections back into the output. It should be appreciated that the self-jamming may be due to near-field (evanescent) or far-field electromagnetic coupling between the transmit and receive antennas and/or due to unwanted coupling between the ports of the components comprising the receiver and/or transmitter. This self-jamming effect, m(t), may be especially noticeable when the antenna system connected to the mixer input has an imperfect reflection coefficient over the bandwidth of interest.

The terms $d_Q(t)$ and $d_I(t)$ represent DC offset 308 and DC offset 310, respectively, which refer to slowly time-varying DC offsets due to internal imbalance in the semiconductor devices used to implement the mixers in the I/Q demodulator (e.g., mixer 302).

Accordingly, in practice, self-jamming and DC offset signals may distort output signals $r_Q$ and $r_I$ from direct conversion receivers utilizing I/Q demodulators.

Higher order harmonics (e.g., generated by filter 210 and/or filter 212 of FIG. 2) may also be present at an output of the receiver, and may be mitigated using one or more linear filters having a transfer function $h_{LP}(t)$. However, the self-jamming and DC offset (e.g., m(t) and $d_Q(t)$ and $d_I(t)$) may be nonlinear effects and may not generally be effectively mitigated using linear filters. The frequency response estimate $\hat{H}(j2f)$ calculated as described with reference to FIG. 2 may in practice include undesired terms and may be expressed as $$\hat{H}(j2\pi f) = H(j2\pi f) + M(j2\pi f) + d(j2\pi df) + n(j2\pi f) \qquad \text{Equation 6}$$

where $M(j2\pi f)$ is the frequency response of the self-jamming m(t), $d(j2\pi f)$ denotes the complex valued DC offset, and $n(j2\pi f)$ is complex valued system noise. To correct for $M(j2\pi f)$ and $d(j2\pi f)$, they may be estimated.

Accordingly, in some examples, a system calibration may be performed to estimate the frequency-response of self-jamming in imaging systems described herein and/or to estimate the complex valued DC offset present in imaging systems described herein. Referring, to FIG. 2, the calibration may be performed by setting $H(j2\pi f)$ to 0, e.g., by terminating an input of the I/Q demodulator 208 (e.g., a mixer of I/Q demodulator 208) with an RF match.

Accordingly, during operation, a system calibration may be performed and the receiver output signals $r_I$ and $r_Q$ may be used to obtain $\hat{H}(j2f)$, which, reviewing Equation 6 with $H(j2\pi f)$ set to zero, is equal to the frequency response of self-jamming added to the complex valued DC offset.

After system calibration, the imaging system may be used to illuminate subjects and receive energy of scattered illumination signals described herein. The values of the frequency response of self-jamming and complex valued DC offset obtained during calibration may be used, e.g. by imaging processor 114 and/or receiver 112 of FIG. 1 to adjust the calculated $\hat{H}(j2f)$. For example, receiver output signals $r_I$ and $r_Q$ may be used to calculate $\hat{H}(j2f)$, and the frequency response of self-jamming and complex valued DC offset obtained during calibration may be subtracted from that value.

In some examples, $M(j2\pi f)$ and $d(j2\pi f)$ are time and temperature varying. Accordingly, the system calibration may advantageously be performed repeatedly, and in some examples continuously (e.g., prior to each subject illumination and/or after some number of subject illuminations). In imaging systems described herein, frequent calibration may detract from the available coherent integration time and thus may have a deleterious effect on achievable signal-to-noise ratio (SNR). In some examples, calibration networks (e.g., impedance networks used to match a receiver input during a system calibration) may be complex and expensive in a spatially diverse imaging system which may have numerous TX and RX ports (e.g. one per TX and/or RX antenna). In some examples, a super-heterodyne receiver may be used to mitigate the self-jamming and the DC offsets by offsetting the intermediate frequency (IF) of the receiver away from DC, but a super-heterodyne receiver architecture may introduce higher cost and complexity due to the need for an offset signal source (e.g., offset local oscillator LO) as well as potentially complex IF filtering and IF filter calibration systems.

Examples described herein mitigate the DC offset and/or self-jamming present in imaging system receivers by employing coded modulation for the illumination signal provided (e.g., radiated) by the illumination system (e.g., transmitters).

Figure 4:
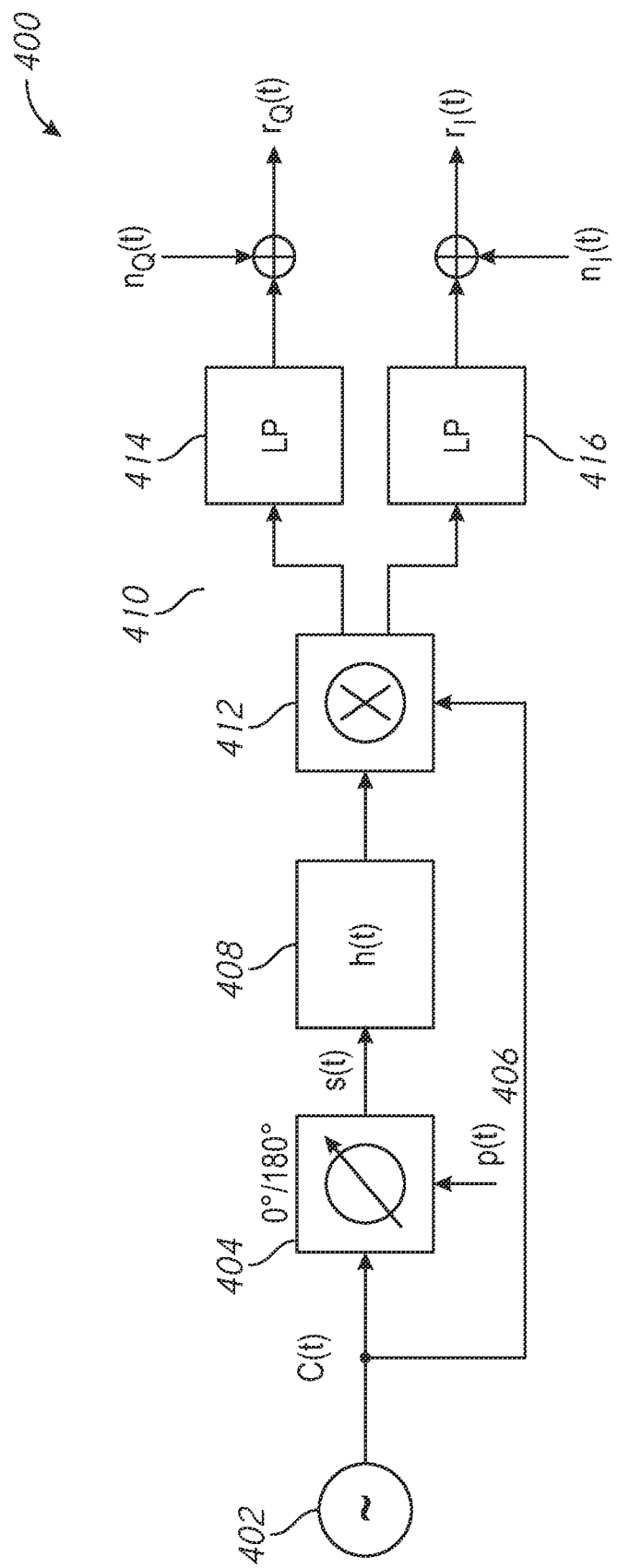
FIG. 4 is a schematic illustration of an imaging system arranged in accordance with examples described herein.

FIG. 4 is a schematic illustration of an imaging system arranged in accordance with examples described herein. All or portions of the imaging system 400 of FIG. 4 may be used to implement and/or may be implemented by all or portions of the system 100 in some examples. The imaging system 400 includes carrier wave source 402, modulator 404 (controlled using modulation control signal 406), channel 408 and direct conversion receiver 410. The direct conversion receiver 410 includes I/Q demodulator 412, filter 414, and filter 416.

The carrier wave source 402 may be a single tone source, which may be a millimeter wave source as described herein. The carrier wave source 402 may provide a carrier wave signal (e.g., single tone signal), c(t). In some examples, carrier wave source 402 may be implemented using an oscillator and c(t) may be an oscillator signal.

The modulator 404 may modulate the single tone signal c(t) with 0° or 180° phase shifts controlled by modulation control signal 406, p(t), to produce an illumination signal s(t).

The channel 408 to be estimated and direct conversion receiver 410 may be implemented as described herein, for example with reference to FIGS. 1-3.

As described herein, modulator 404 may use binary phase shift keying modulation, as shown in FIG. 4, but other modulation techniques may be used, including multi-phase modulation, quadrature phase shift keying modulation, orthogonal frequency division modulation and/or amplitude modulation. The modulator 404 may utilize a modulation control signal 406 to control the modulation. The modulation control signal 406 may be made up of a number of symbols, which may be, e.g., a sequence of +1/−1 and/or may be a sequence of codes (e.g., Hadamard codes). In some embodiments, the symbols may comprise discrete amplitude and phase states which may be digitally encoded to correspond to one or more bits.

Referring to the example of FIG. 4, using BPSK modulation, the illumination signal s(t) may be expressed as:

$$s(t) = \cos(2\pi f t + \varphi) \Sigma_i p_i \text{rect}(t - Ti) \qquad \text{Equation 7}$$

Where transmitted symbols are represented by $p_i\{-1, +1\}$ and rect(t) being a rectangle pulse which may be written as:

$$rect(t) = \begin{cases} 1, & 0 \le t \le T \\ 0, & \text{otherwise,} \end{cases} \qquad \text{Equation 8}$$

where T is the pulse period of the modulation control signal 406.

Considering the channel as having a channel coherence bandwidth B>(1/T), the channel transfer function H(j2πf) may be considered as a flat channel with a frequency range between (f−B/2) and (f+B/2), so the received signal r(t) provided to the direct conversion receiver 410 out of channel 408 may be written as $$r(t) = |H(j2\pi f)|\cos(2\pi ft + \varphi + \angle H(j2\pi f))\Sigma_i p_i \text{rect}(t - Ti) \quad \text{Equation 9}$$

After down-conversion and low-pass filtering provided by I/Q demodulator 412, filter 414, and filter 416, the in-phase and quadrature-phase received signals may be written as:

$$r_I(t) = |H(j2\pi f)|\cos(\angle H(j2\pi f))\Sigma_i p_i \text{rect}(t - Ti) + M(j2\pi f) |\cos(\angle M(j2\pi f)) + d_I(t) + n_I(t) \quad \text{Equation 10}$$

$$r_Q(t) = |H(j2\pi f)|\sin(\angle H(j2\pi f))\Sigma_i p_i \text{rect}(t - Ti) + |M(j2\pi f)| \sin(\angle M(j2\pi f)) + d_Q(t) + n_Q(t). \quad \text{Equation 11}$$

where $d_I$ and $d_Q$ represent the dc offset in the I and Q channels respectively. After sampling, the received signal may be written as:

$$r[i] = r_I\left(\frac{T}{2} + iT\right) + jr_Q\left(\frac{T}{2} + iT\right) = \quad \text{Equation 12}$$
$$p_i H(j2\pi f) + M(j2\pi f) + d[i] + n[i],$$

where i={1, 2, 3 ...} corresponding to each of a plurality of symbols passing through the transmitter-receiver system.

In this manner, note that the sign of the contribution of the channel to the received signal changes depending on the modulation symbol (e.g., BPSK symbol $p_i$). However, the self-jamming M(j2πf) and dc offset d[i] do not change sign depending on the modulation symbol (e.g., BPSK symbol). In this manner, a post-processor (e.g., imaging processor 114 of FIG. 1) may remove the contributions of self-jamming and DC offset. For example, received signals from multiple (e.g., two, four) consecutive modulation symbols may be subtracted. The subtraction may eliminate constant contributions between the two symbols (e.g., the self-jamming and DC offset signals), but may retain the contribution from the channel, which may be normalized in accordance with how many symbols were utilized in the subtraction.

Consider an example using BPSK modulation where $p_i = +1$ for i={1, 3, 5, ...} and $p_i = -1$ for i={2, 4, 6 ...}. The estimated Ĥ(j2f) may be written as $$\hat{H}(j2\pi f) = \frac{1}{2}(r[2i] - r[2i+1]) \quad \text{Equation 13}$$
$$= H(j2\pi f) + \bar{n}_2$$

where $n_2$ is the noise average of the two consecutive samples, and assuming H(j2πf) and d[i] did not change over time. Note that in addition to the self-jamming and DC offset mitigation, the estimator's normalized mean squared error (NMSE), which may be expressed as $$NMSE = \frac{E\{|\hat{H}(j2\pi f) - H(j2\pi f)|^2\}}{E\{|H(j2\pi f)|^2\}}, \quad \text{Equation 14}$$

decreases by 3 dB (assuming zero-mean noise) due to the aforementioned noise averaging. In general, a summation over an odd multiple, e.g. 2N with N ∈ ℕ⁺, of consecutive measurements r[i], given as:

$$\hat{H}(j2\pi f) = \frac{1}{2N}\sum_{i=0}^{N-1}(r[2i] - r[2i+1]) \quad \text{Equation 15}$$
$$= H(j2\pi f) + \bar{n}_{2N},$$

leads to an NMSE decrease of 2N.

In some examples, modulators (e.g., modulator 404) may additional utilize codes, such as balanced orthogonal codes, for example, Hadamard sequences, for the modulation control signal (e.g., p(t)) sequences to allow the separation of received signals simultaneously sent from multiple transmitters. For example, a respective code from a plurality of codes may be used to modulate c(t) for a particular transmitter (e.g., antenna). Each antenna may transmit a signal modulated with a respective code. The balanced property of the codes may be useful for mitigating the DC offset and self-jamming, and the orthogonality property may allow for the estimation of the channels between the receiver and each of the transmitters. For example, with 27 Hadamard codes of length 28, the channels between a single receiver and up to 27 parallel transmitters may be estimated all or partially simultaneously.

In some examples, multiple spatially distributed TXs and RXs (e.g., spatially distributed transmit antennas and receive antennas) may be used which may improve ROI size and achievable resolution in some examples. To minimize motion blur due to a moving scene, data acquisition time may advantageously be minimized. Accordingly, in some examples, multiple-input multiple-output (MIMO) processing may be used to operate some or all TXs and RXs simultaneously. However, to facilitate simultaneous TX and RX operation, an ability to distinguish the signals from different TXs at each receiver may be used, so the TX signals must be separable.

Accordingly, examples described herein include systems and methods using an orthogonal coded active illumination (OCAI) approach for massive MIMO mmW imaging which utilizes balanced binary orthogonal codes to separate TX signals at the receivers, while simultaneously mitigating RX self-jamming and DC offset impairments as described herein.

Figure 5:
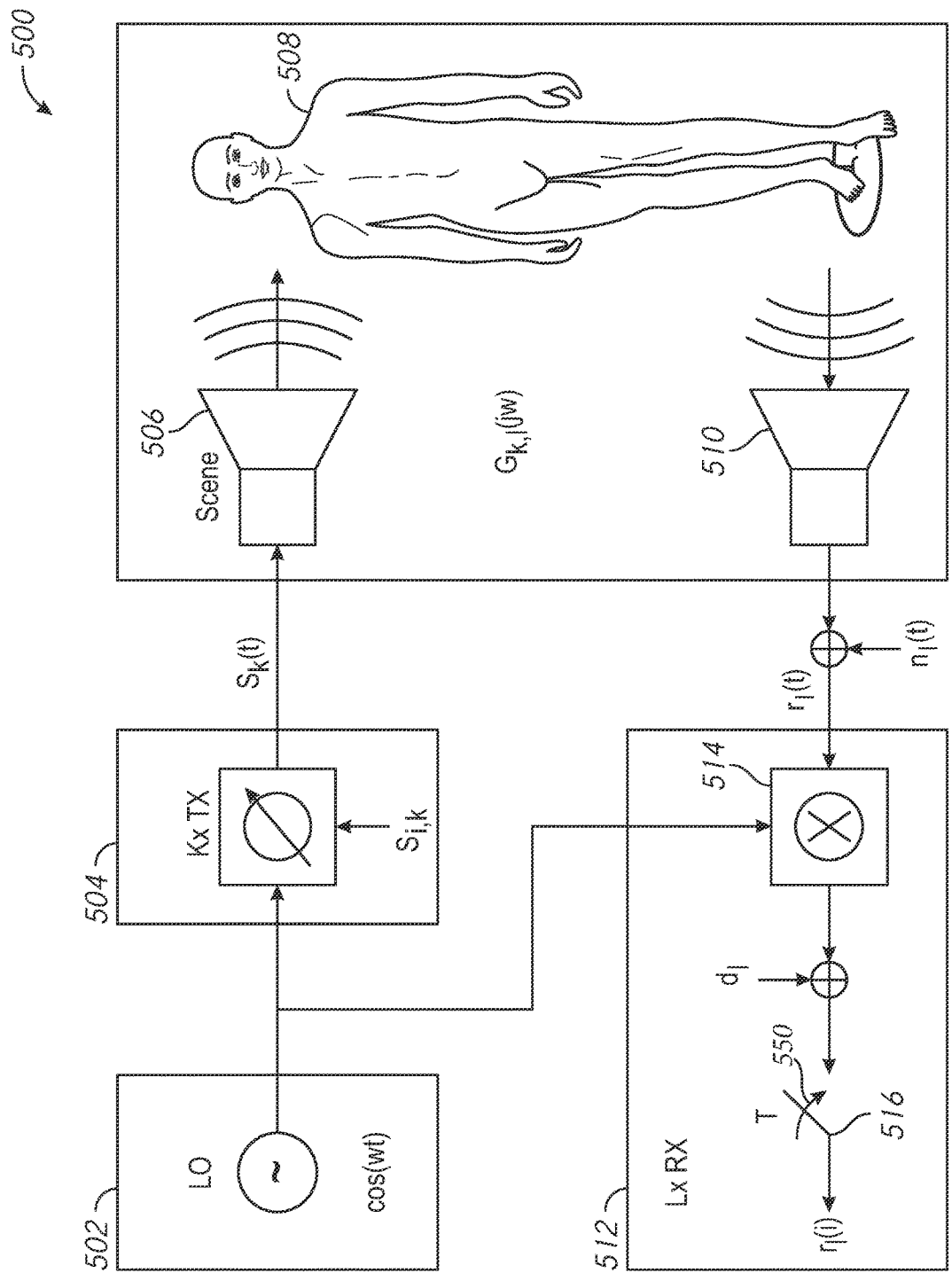
FIG. 5 is a schematic illustration of an imaging system utilizing MIMO and arranged in accordance with examples described herein.

FIG. 5 is a schematic illustration of an imaging system utilizing MIMO and arranged in accordance with examples described herein. The imaging system 500 includes carrier wave source 502, a plurality (K) of modulators, including modulator 504, antennas 506, subject 508, antennas 510, and a plurality (L) of receivers, including receiver 512. Each receiver, such as the receiver 512, may include direct conversion receiver 514 and switch 516. The imaging system 500 may be used to implement and/or may be implemented by system 100 of FIG. 1 in some examples.

The carrier wave source 502, which may be implemented using a local oscillator, may provide a single tone signal to each of the plurality of modulators, such as modulator 504. In some examples, one carrier wave source may provide a signal to multiple modulators. In some examples, multiple carrier wave sources may be provided that each provide a respective modulator with a radio frequency signal.

Multiple modulators may be provided. Generally, each modulator may modulate a radio frequency signal provided by carrier wave source 502 for generating an illumination signal for one antenna. In some examples, the illumination signal generated by one modulator may be provided to multiple antennas, however. In the example of FIG. 5, each modulator may generate an illumination signal for one antenna. Accordingly, the K modulators of FIG. 5 may couple to a respective K antennas—e.g., antennas 108.

The modulators of FIG. 5, such as modulator 504, may implement techniques described herein, such as with reference to FIG. 1-FIG. 4, to reduce the effects of self-jamming and/or DC offset at the receiver. For example, each modulator, such as modulator 504 may implement phase shift keying, such as BPSK and/or QPSK. Moreover, in order to allow a receiver to discriminate amongst signals from the multiple antennas, the modulators of FIG. 5, such as modulator 504, may modulate using one or more symbols corresponding to a code for each antenna. Accordingly, the modulation control signal $s_{i,k}$ shown in FIG. 5 may be different for each antenna.

Generally, the orthogonal codes may be introduced by the modulators described herein, such as modulator 504 at a lower frequency (e.g., kHz and/or MHz) modulation of the generally GHz carrier wave source. The illumination signal (e.g., transmitted signal) from the kth modulator (and kth antenna of antennas 108) of FIG. 5, using a code length of M can be represented as:

$$s_k(t) = \mathcal{R}\left\{e^{+j\omega t}\sum_{i=0}^{M-1} s_{i,k}\, rect_T(t-iT)\right\} \quad \text{Equation 16}$$

where $s_{i,k} \in \{-1, +1\}$ is the ith binary code symbol of the lth transmitter, and $rect_T(t)$ is a unit rectangle over the code symbol period $0 \leq t < T$.

As described herein, illumination signals provided by modulators and antennas 108 may be scattered off objects in a scene, such as subject 508. Scattered illumination signals may be incident on antennas 110, which may provide energy from the scattered illumination signals to receivers, such as receiver 512. The receivers may include direct conversion receivers, such as direct conversion receiver 514 which may include an I/Q demodulator and one or more filters. Generally, any of the direct conversion receivers described herein may be used to implement receiver 512 and/or direct conversion receiver 514. Each receiver may include a sampling system modeled as a switch, such as switch 516 for sampling 550 the received signal at, e.g., the symbol period T. In some embodiments the sampling system may include an analog to digital converter (ADC) which converts continuous time, continuous valued analog input signals into discrete time, discrete valued signals. In such embodiments the sampling aspect of the ADC may be modeled as switch 516.

The received signal provided to the lth receiver from antennas 110 of FIG. 5 may be written as:

$$r_l(t) = \sum_{k=1}^{K} \mathcal{R}\left\{G_{k,l}(j\omega)e^{+j\omega t}\sum_{i=0}^{M-1} s_{i,k}\, rect_T(t-iT)\right\} + n_l(t). \quad \text{Equation 17}$$

After down-conversion and sampling by the receivers, e.g., direct conversion receiver 514 an switch 516 the received signal may be written as:

$$r_l[i] = \sum_{k=1}^{K} G_{k,l}(j\omega)s_{i,k} + d_l + v_l[i] \quad \text{Equation 18}$$

Concatenating the M received samples from lth receiver into a vector (which may be performed, e.g. by a post-processor and/or image processor) results in a vector $r_l = [r_l[0] r_l[1] \ldots r_l[<-1]]^T$ where $(.)^T$ is the conjugate operator, and leads to the linear vector equation $r_l = Sg_l + d_l1 + v_l$, where each matrix element $[S]_{(i+1),k} = s_{(i+1),k}$, $[g_l]_k = G_{k,l}(j\omega)$, 1 is a vector of all ones, and $[v_l]_{(i+1)} = v_l[i]$.

The codes used may be mutually orthogonal, e.g., $S^\dagger S = MI$, where I is an identity matrix. Moreover, the codes used may be balanced, e.g., $S^\dagger 1 = Z$, with Z being a vector of all zeros.

In this manner, a channel transfer function may be estimated (e.g., by a post-processor and/or image processor described herein) as a vector $\hat{g}_l$ obtained in a least-squares sense as:

$$\hat{g}_l = \frac{1}{M}S^\dagger r_l, \quad \text{Equation 19}$$

where $S^\dagger$ represents the conjugate transpose of S. In some examples, Hadamard codes may be used, which may be obtained from columns of Hadamard matrices.

In this manner as described herein, illumination systems may be provided for illuminating a scene. The illumination systems may utilize modulation techniques, including phase shift keying, multi-phase modulation, and/or balanced, orthogonal codes. Accordingly, direct conversion receivers may be used while minimizing, reducing and/or compensating for self-jamming and/or DC offset signals generated by the direct conversion receivers.

From the receiver output signals, information about the channel, e.g., the channel impulse response h(t), may be obtained as described herein. Image data pertaining the channel may be generated, and images based on the image data may be rendered and/or displayed in 2D and/or 3D, e.g., utilizing imaging processor 114 of FIG. 1. Imaging processor 114 of FIG. 1 may be implemented using a variety of processor(s), such as a graphics processing unit (GPU) and/or central processing unit (CPU) in some examples.

3D mmW image reconstruction may be considered to be an inverse problem which uses a concatenation of frequency dependent backscatter measurements of the subject (e.g., scene $\hat{g}$) to estimate for the reflectivity coefficients $\{\rho n\}$ in the scene. The corresponding forward model may be written as:

$$\hat{g} = H\rho + +v, \quad \text{Equation 20}$$

where $\rho = [\rho 1, \rho 2, \ldots, \rho_N]^T$, H denotes the measurement matrix which represents a relationship between the measurements and the reflectivity in the scene, and v is noise. Reconstruction of image data associated with the scene accordingly may involve solving for:

$$\hat{\rho} = \arg\min_{\rho}\{\|\hat{g} - H\rho\|^2 + \lambda\|\rho\|^2\} \quad \text{Equation 21}$$

which represents a least-squares (LS) approach with a minimum norm solution regularizer. The latter may be advantageous as H may be typically underdetermined. In some examples, a sensor may be used to confine a reconstruction volume to a particular number of voxels, e.g. to ~200,000 voxels (1.6 cm×0.6 cm×0.6 cm) for human-sized targets. A variety of imaging approaches may be used to solve the above numerical problem to generate image data. For example, a GPU accelerated GMRES algorithm may be used in some examples.

Figure 6:
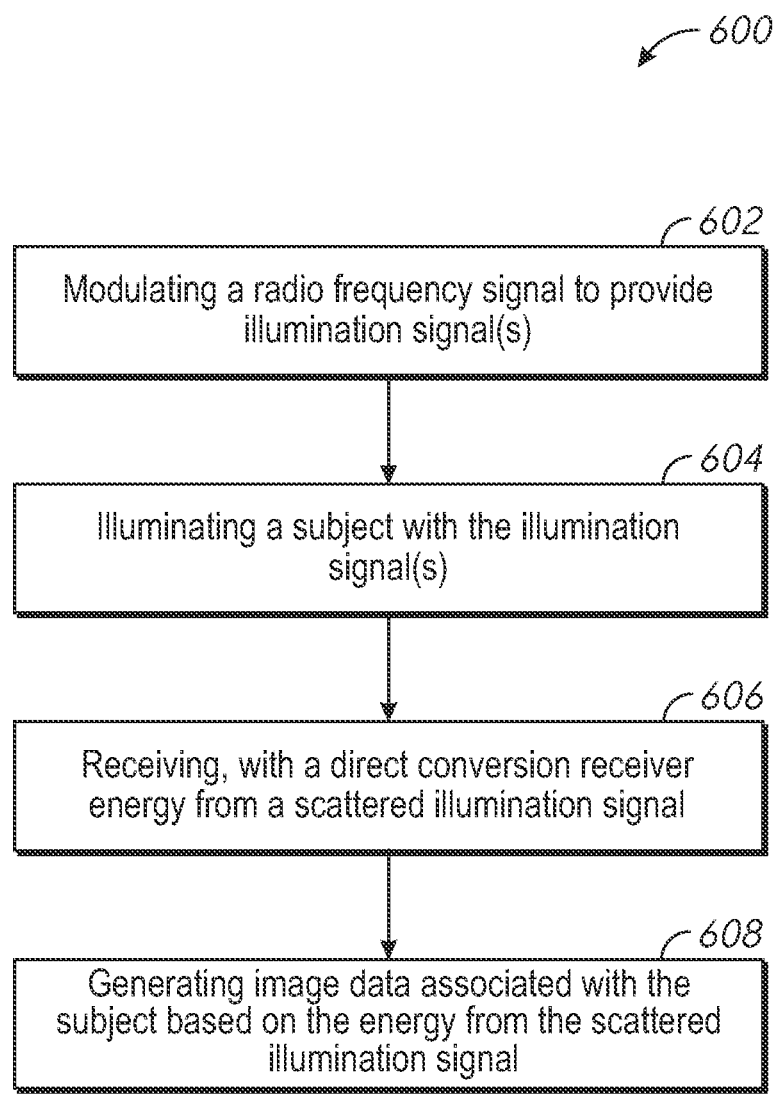
FIG. 6 is a flowchart of a method arranged in accordance with examples described herein.

FIG. 6 is a flowchart of a method arranged in accordance with examples described herein. The method 600 includes block 602, which may be followed by block 604, which may be followed by block 606, which may be followed by block 608. In other examples, additional, fewer, and/or different blocks may be used. Systems and devices described herein, such as those described with reference to FIG. 1-FIG. 5 may be used to implement all and/or portions of method 600.

The method 600 includes, at block 602, modulating a radio frequency signal to provide an illumination signal. For example, the modulator 106 of FIG. 1 may modulate the carrier wave source 104 of FIG. 1. As described herein, a variety of modulation techniques may be used to provide one or more transmitted symbols, using a variety of techniques including phase shift keying (binary and/or quadrature), orthogonal frequency division multiplexing (OFDM) and/or amplitude shift keying. In some examples, the modulation in block 602 may additionally or instead include modulating with a code, such as a balanced, orthogonal code. A different code may in some examples be used to modulate the radio frequency signal for each antenna which will radiate the illumination signal.

At block 604, a scene may be illuminated with the illumination signal(s). In some examples, multiple antennas are used to conduct the illuminating, such as antennas 108 of FIG. 1. The antennas may in some examples be positioned to radiate the illumination signal(s) toward the scene (e.g., positioned in a vestibule into which the scene may be located). During block 604 in some examples, the antennas may be stationary (e.g., the antennas need not move about the subject, although in some examples they may).

In block 606, energy may be received, using a direct conversion receiver (e.g., receiver 112 of FIG. 1), from a scattered illumination signal resulting in part from scattering of the illumination signal(s) from the scene. In some examples, block 606 may occur wholly and/or partially simultaneously with block 604. As described herein, the modulation of the illumination signal(s) may allow for the direct conversion receiver to recover information about the channel (e.g., including the scene) while minimizing and/or reducing effects of self-jamming and/or DC offset signals generated by the direct conversion receiver. The receiver, and/or a post-processor may separate energy from the scattered illumination signal from a self-jamming signal generated by the direct conversion receiver. For example, consecutive symbols of received energy may be subtracted which may wholly and/or partially cancel contributions due to self-jamming and/or DC offset. Antennas used to receive incident energy in block 606 (e.g., antennas 110 of FIG. 1) may be stationary during block 606 in some examples. In some examples, during the receiving, information received from the illumination system may be used to facilitate receiver operation (e.g., knowledge of the carrier wave frequency and/or modulation scheme).

In block 608, image data associated with the subject may be generated based on the received energy. For example, imaging processor 114 of FIG. 1 may generate the image data. The image data may be based on information about the channel obtained by the receiver in some examples. A 2D and/or 3D image may be rendered and/or displayed using the image data.

Examples of imaging systems and methods described herein may find use in a variety of fields and/or for imaging a variety of scenes. Examples include personnel screening (e.g., imaging one or more humans to identify contraband which may be positioned beneath clothing and not externally visible to the human eye), weapon detection (e.g., imaging one or more humans and/or bags or other containers to identify weapons which may not be visible to the human eye), reconnaissance, autonomous robotics, non-destructive testing, structural evaluation, and/or remote sensing (e.g., imaging an environment remote from an operator). In some examples, the scene to be imaged includes one or more inanimate objects and their constituent parts. This can include objects such as cars, aircraft, other vehicles, or buildings. Other examples of scenes include parts of buildings such as walls, ceilings, floors, columns, pipes, wiring, or other utilities. Further examples include the ground, and/or objects at least partially buried in the ground. Still further examples of scenes include one or more objects within a container such as a box.

For remote sensing applications, illumination system(s) and receiver(s) may be positioned in the environment to be sensed. Data, such as receiver signal(s) and/or image data described herein may be transmitted from the environment to another location (e.g., a remote and/or centralized workstation) for the rendering of an image of all or part of the environment.

EXAMPLES

An implemented example is described using a K-band (e.g., 17-26 GHz) mmW imaging setup. In the implemented example, suppression of DC offset and LO leakage is attained using a BPSK source modulated by a balanced orthogonal code. In one example, the DC offset was reduced by over 35× and the receiver sensitivity was improved by over 40 dB (1,000×).

DC offset versus frequency was measured for a K-band (17-26 GHz) millimeter wave receiver. The frequency dependent DC offset due to the I/Q demodulator non-ideality described herein was readily evident in the form of a large peak-to-peak variation (over 0.035V pk-pk over the bandwidth) in the DC signal at the output of the I/Q demodulator.

The measured DC offset versus frequency for the same K-band (17-26 GHz) millimeter wave receiver was observed after applying methods described herein. The frequency dependent DC offset due to the aforementioned I/Q demodulator non-ideality was shown to be greatly reduced; the peak-to-peak variation in the DC signal at the output of the I/Q demodulator was been reduced to below 0.001 V pk-pk over the measurement bandwidth. This is an approximately 35× reduction in the unwanted DC offset.

The receiver sensitivity was measured for a direct conversion mmW imaging receiver prior to applying the methods described herein. The noise floor (minimum discernable signal) was relatively poor, for example at a frequency of 20 GHz the noise floor of the receiver was approximately −60 dBm. This may be due to the presence of self-jamming energy.

Receiver sensitivity was improved when using methods described herein. The same receiver was measured after employing an example of the self-jamming mitigation approach described herein. The noise floor of the receiver was significantly improved. For example, at the same frequency of 20 GHz, the noise floor improved to better than −100 dBm. This was an improvement of over 40 dB (10,000×).

An implemented example of a system using OCAI techniques described herein is also described. The coding gain offered by this approach improved imager signal to noise ratio (SNR) performance by up to 15 dB using codes of symbol length 32. A custom massive MIMO mmW imager was used having 24 simultaneous TX and 72 simultaneous RX operating in the K-band (e.g., 17.5 GHz to 26.5 GHz). The example imager leveraged both spatial coding via frequency diverse metasurface antennas, and temporal coding via OCAI of the scene.

A prototype massive MIMO mmW imager for which an OCAI scheme was developed included L=72 RXs and K=24 TXs grouped into twelve modules. These modules, arranged on an irregular grid to avoid aliasing effects in the reconstruction, formed a 2.1×2.1 m metasurface aperture which was able to obtain images in human-scale scenes. The metasurface TX/RX antennas were 2D irregular shaped chaotic cavity antennas with horizontal (TXs) and vertical (RXs) oriented sub-wavelength slot irises that formed a Mills-Cross configuration. The antenna radiation patterns were frequency-diverse, forming chaotic antenna patterns depending on the frequency illuminating the scene. This approach resulted in a frequency dependent backscatter measurement of the ROI that contained spatially encoded backscattered scene information.

Each antenna had an associated transmitter or receiver that implemented the stepped-FM, massive MIMO measurement. The radio frequency (RF) range of the imager system was from 17.5 GHz to 26.5 GHz, covering the entire K-band spectrum with N=101 frequency steps and an average system noise floor of −100 dBFS. An OCAI scheme based on Hadamard codes of length M=32 was used. All 24 transmitters and 72 receivers operated in parallel to make the MIMO measurement.

The imager obtained K×L×M×N≈5.6×10⁹ measurements per frame with a frame rate of up to 10 Hz. The expected resolution was 1.6 cm in range and 0.6 cm in cross-range at a distance of 1 m in front of the imager aperture.

Measurements and image reconstructions of resolution targets using the massive MIMO mmW imager were compared to the results of a second imager prototype that did not have OCAI enabled. The latter used the same metasurface antenna aperture but measurements were obtained by a single RX/TX pair using a switch-based signal distribution network to sequentially switch through all the different RX/TX antenna combinations. The frame rate in the OCAI case was 7 Hz, while in the non-OCAI case each frame took ≈30 s to acquire due to the non-OCAI sequential acquisition having significant switching speed penalties. The resolution targets consisted of a series of parallel metal strips with a width and spacing of 30 mm, 20 mm, and 7 mm. The targets were placed 1 m in front of the imager. The image quality improvement due to OCAI was apparent from a visible improvement in image uniformity and shape definition. The useful resolution was also improved.

From the foregoing it will be appreciated that, although specific embodiments have been described herein for purposes of illustration, various modifications may be made while remaining with the scope of the claimed technology.

What is claimed is:
1. An imaging system comprising:
an illumination system configured to
generate a plurality of modulated radio frequency signals from a plurality of carrier wave sources using a plurality of digital symbols comprising balanced codes;
provide, based at least on the plurality of modulated radio frequency signals, illumination signals;
a plurality of antennas coupled to the illumination system and configured to:
illuminate a scene, based at least on the illumination signals;
a plurality of direct conversion receivers, each configured to receive energy from scattered illumination signals resulting in part from scattering of the illumination signals from the scene and in part from self-jamming signals; and
an imaging processor coupled to the plurality of direct conversion receivers, configured to provide image data associated with the scene based on the energy from the scattered illumination signals, wherein generating the image data associated with the scene comprises separating energy from the scattered illumination signals from energy from the self-jamming signals, the separating based at least on subtracting a first cross-correlation between the digital symbols comprising balanced codes and the scattered illumination signals, and a second cross-correlation between the digital symbols comprising balanced codes and the self-jamming signals.

2. The imaging system of claim 1, wherein the radio frequency signals have a frequency between 30 and 300 GHz.

3. The imaging system of claim 1, wherein generating the plurality of modulated radio frequency signals is based at least on the using phase modulated digital symbols having two or more phases.

4. The imaging system of claim 1, wherein the generating the plurality of modulated radio frequency signals is based at least on using amplitude modulated digital symbols having two or more amplitudes.

5. The imaging system of claim 1, wherein the generating the plurality of modulated radio frequency signals is based at least on using a respective digital code from a set of balanced codes for each of the plurality of antennas.

6. The imaging system of claim 5, wherein the set of balanced codes comprises balanced orthogonal codes.

7. The imaging system of claim 6, wherein the set of balanced codes comprises Hadamard codes.

8. The imaging system of claim 1, further comprising a display coupled to the imaging processor and configured to display an image based on the image data, wherein the image comprises a representation of the scene.

9. The imaging system of claim 1, wherein the scene comprises a human.

10. The imaging system of claim 1, wherein each of the plurality of direct conversion receivers are configured to receive the energy from the scattered illumination signals during at least a portion of time the illumination system is providing the illumination signals.

11. The imaging system of claim 1, wherein each of the direct conversion receivers is coupled to the illumination system, and wherein each of the plurality of direct conversion receivers is configured to receive the energy from the scattered illumination signal using knowledge of a radio frequency signal.

12. The imaging system of claim 1, wherein each of the plurality of direct conversion receivers is configured to generate receiver signals including contributions from the energy received from the scattered illumination signals, self-jamming signals, and a DC offset, and wherein the imaging system further comprises a post-processor configured to subtract receiver signals received corresponding to a first subset, selected from a balanced code, of modulation symbols, from receiver signals received corresponding to a second subset, selected from another balanced code, of modulation symbols to separate the contributions of the energy received from the scattered illumination signals from the self-jamming signals and the DC offset.

13. A method for imaging a scene, the method comprising:
modulating a plurality of radio frequency signals using a plurality of digital symbols comprising balanced codes to provide a plurality of illumination signals;
illuminating the scene with the plurality of illumination signals using a plurality of antennas;
receiving, using a plurality of direct conversion receivers, energy from scattered illumination signals resulting in part from scattering of the plurality of illumination signals from a subject and in part from self-jamming signals; and
generating image data associated with the scene based on the energy from the scattered illumination signals, wherein generating the image data associated with the scene comprises separating energy from the scattered illumination signals from energy from the self-jamming signals, the separating based at least on subtracting a first cross-correlation between the digital symbols comprising balanced codes and the scattered illumination signals, and a second cross-correlation between the digital symbols comprising balanced codes and the self-jamming signals.

14. The method of claim 13, wherein the digital symbols comprise binary phase shift keying modulation or quadrature phase shift keying modulation.

15. The method of claim 13, wherein the receiving occurs at least in part simultaneously with the illuminating.

16. The method of claim 13, wherein the plurality of antennas are stationary during the illuminating.

17. The method of claim 13, further comprising modulating the illumination signals using balanced orthogonal codes for respective ones of the plurality of antennas.

18. The method of claim 13, further comprising displaying an image based on the image data.

19. The method of claim 18, wherein the image comprises a representation of the scene.

20. The method of claim 13, wherein said receiving comprises receiving based on a phase shift keying modulation.

21. The method of claim 20, wherein said receiving comprises separating energy from the scattered illumination signal from the self-jamming signals provided by the plurality of direct conversion receivers.

22. The method of claim 21, wherein said separating energy comprises subtracting receiver signals associated with groups of modulation symbols.

23. The method of claim 13, wherein the plurality of illuminations signals are generated based at least on using a respective balanced digital code, and wherein the receiving is provided by the plurality of direct conversion receivers, each direct conversion receiver of the plurality of direct conversion receivers configured to at least partially simultaneously receive the scattered illumination signals including energy resulting in part from scattering of the illumination signals generated by the plurality of direct conversion receivers.

24. The method of claim 23, further comprising separating contributions to the scattered illumination signals including correlating between respective balanced digital codes and the scattered illumination signals.

* * * * *